US010914262B1

(12) United States Patent
Laskowsky et al.

(10) Patent No.: US 10,914,262 B1
(45) Date of Patent: Feb. 9, 2021

(54) DIAGNOSTIC METHODS AND SYSTEMS

(71) Applicant: GM GLOBAL TECHNOLOGY OPERATIONS LLC, Detroit, MI (US)

(72) Inventors: Patricia M. Laskowsky, Ann Arbor, MI (US); Dana J. Suttman, West Bloomfield, MI (US); Jin Shen, Northville, MI (US); Jeffrey M. Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/573,006

(22) Filed: Sep. 17, 2019

(51) Int. Cl.
*B60T 7/12* (2006.01)
*F02D 41/22* (2006.01)

(52) U.S. Cl.
CPC ...... *F02D 41/221* (2013.01); *F02D 2041/224* (2013.01)

(58) Field of Classification Search
CPC ... B60W 2510/0619; B60W 2710/0622; F02B 19/1052; F02B 19/1085; F02D 35/0046; F02D 35/0092; F02D 41/0002; F02D 2700/02; F02D 2700/0217; F02D 2700/0225
USPC .................................. 701/103–106, 114, 115
See application file for complete search history.

(56) References Cited

U.S. PATENT DOCUMENTS

2009/0312941 A1* 12/2009 Wang .................... F02D 35/023 701/114
2011/0130903 A1* 6/2011 Heisel .................. B60W 10/06 701/22
2014/0067232 A1* 3/2014 Hattar .................. F02M 69/465 701/103

* cited by examiner

*Primary Examiner* — John Kwon
(74) *Attorney, Agent, or Firm* — Lorenz & Kopf, LLP

(57) ABSTRACT

Methods and systems are provided for monitoring a fuel injector of an internal combustion engine. In one embodiment, a method includes: receiving a set of feature data, the feature data sensed from a fuel injector during a fuel injection event; processing, by a processor, the set of feature data with a machine learning model to generate a prediction of a fault status; and selectively generating, by the processor, a notification signal based on the prediction.

16 Claims, 5 Drawing Sheets

DIAGNOSTIC METHODS AND SYSTEMS

INTRODUCTION

The technical field generally relates to internal combustion engines, and more particularly relates to methods and systems for diagnosing fuel injectors of an internal combustion system.

Internal combustion engines include fuel injectors that inject fuel into an intake air stream to produce an air/fuel mixture. When a fuel injector fails, it does not deliver a desired amount of fuel or any amount of fuel into the air. Without the proper amount of fuel, the air/fuel mixture may not combust, thereby causing disruption in engine operation.

Accordingly, it is desirable to provide methods and systems for monitoring fuel injectors. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for monitoring a fuel injector of an internal combustion engine. In one embodiment, a method includes: receiving a set of feature data, the feature data sensed from a fuel injector during a fuel injection event; processing, by a processor, the set of feature data with a machine learning model to generate a prediction of a fault status; and selectively generating, by the processor, a notification signal based on the prediction.

In various embodiments, the machine learning model is a logistic regression model. In various embodiments, the logistic regression model sums the multiplication of the set of feature data with hypothesis.

In various embodiments, further the method includes comparing the prediction with truth data to determine an error. In various embodiments, the comparing is based on a cost function.

In various embodiments, the method includes updating the logistic regression model based on the error. In various embodiments, the updating is based on a chain rule method.

In various embodiments, the method includes tuning the machine learning model based on distributions computed from the prediction. In various embodiments, the tuning comprises adjusting a bias unit of a logistic regression model.

In various embodiments, the set of feature data comprises a first closing time, a first opening magnitude, a first opening magnitude location, a second opening magnitude, a second opening magnitude delta, a location inside a window where the second opening magnitude was detected, and a raw voltage at an early point in the window.

In one embodiment, a system includes: at least one sensor that generates sensor data based on observable conditions of the fuel injector; and a controller configured to, by a processor, receive the sensor data, process the sensor data with a machine learning model to generate a prediction of a fault status, and selectively generate a notification signal based on the prediction.

In various embodiments, machine learning model is a logistic regression model. In various embodiments, the logistic regression model sums the multiplication of the set of feature data with hypothesis.

In various embodiments, the controller is further configured to compare the prediction with truth data to determine an error. In various embodiments, the controller compares based on a cost function. In various embodiments, the controller is configured to update the logistic regression model based on the error.

In various embodiments, the controller is configured to update based on a chain rule method.

In various embodiments, the controller is configured to tune the machine learning model based on distributions computed from the prediction. In various embodiments, the controller is configured to tune by adjusting a bias unit of a logistic regression model.

In various embodiments, the set of feature data comprises a first closing time, a first opening magnitude, a first opening magnitude location, a second opening magnitude, a second opening magnitude delta, a location inside a window where the second opening magnitude was detected, and a raw voltage at an early point in the window.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
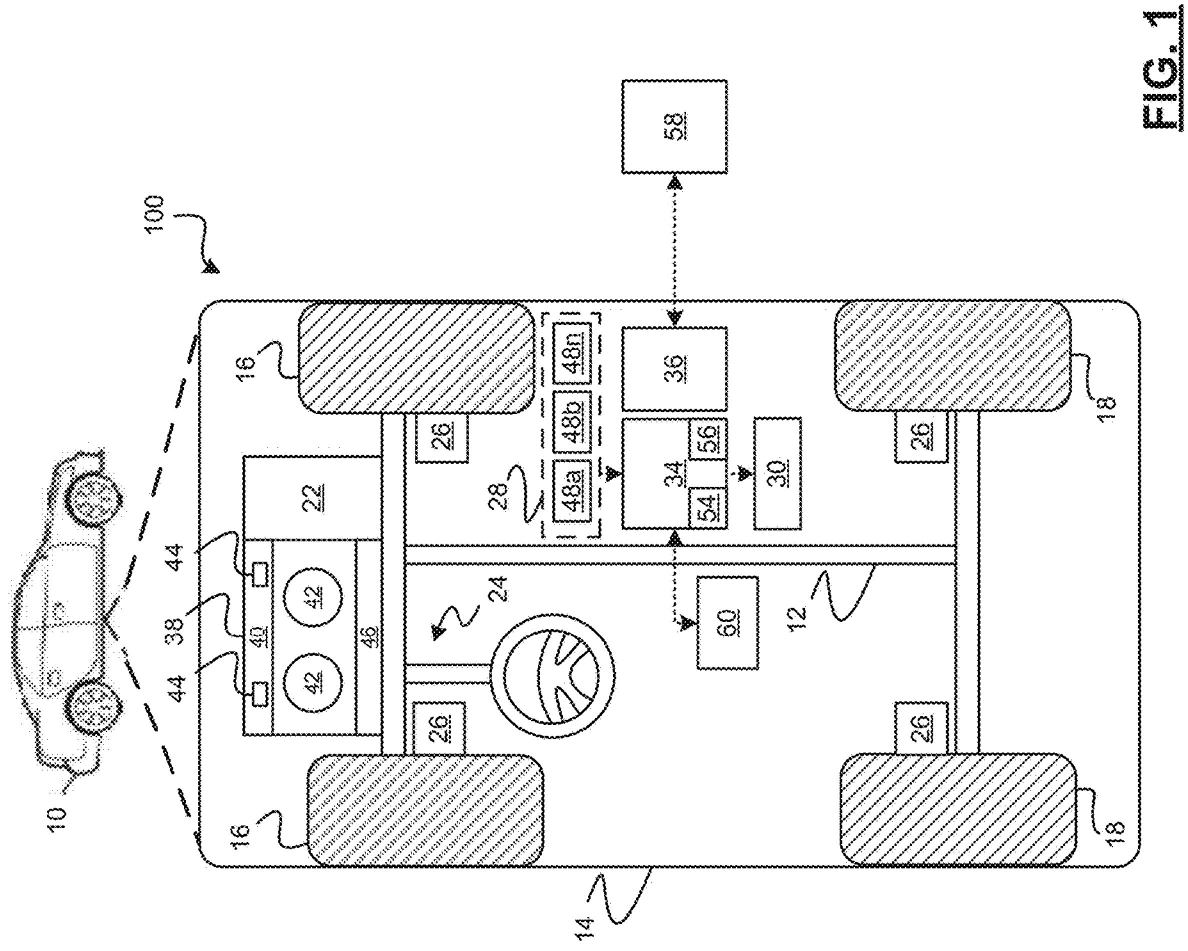
FIG. 1 is a functional block diagram illustrating a vehicle having a fuel injector monitoring system in accordance with various embodiments.

With reference to FIG. 1, a fuel injector monitoring system shown generally at 100 is associated with a vehicle 10 in accordance with various embodiments. In general, the fuel injector monitoring system 100 monitors fuel injectors of an internal combustion engine for faults. As will be discussed in more detail below, the fuel injector monitoring system 100 monitors the fuel injectors based on machine learning methods.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous, a semi-autonomous, or non autonomous vehicle. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine 38.

The engine 38 combusts an air/fuel mixture to produce drive torque for the vehicle 10. For example, air is drawn into the engine 38 through an intake system 40. The intake system 40 includes an intake manifold and a throttle valve. Air from the intake manifold is drawn into cylinders 42 of the engine 38. While the engine 38 may include multiple cylinders 42, for illustration purposes two representative cylinders 42 are shown. For example, the engine 38 may include 2, 3, 4, 5, 6, 8, 10, and/or 12 cylinders.

In various embodiments, the engine 38 may operate using a four-stroke cycle including an intake stroke, a compression stroke, a combustion stroke, and an exhaust stroke. During the intake stroke, air from the intake manifold is drawn into the cylinders 42 through an intake valve. Fuel injectors 44 are controlled to inject fuel into the air to achieve a target air/fuel ratio. Fuel may be injected into the intake manifold at a central location or at multiple locations, such as near the intake valve of each of the cylinders 42. In various implementations, fuel may be injected directly into the cylinders 42 or into mixing chambers associated with the cylinders.

The injected fuel mixes with air and creates an air/fuel mixture in each cylinder 42. During the compression stroke, a piston (not shown) within the cylinder 42 compresses the air/fuel mixture. In various embodiments, the engine 38 may be a compression-ignition engine, in which case compression in the cylinder 42 ignites the air/fuel mixture. Alternatively, the engine 38 may be a spark-ignition engine, in which case a spark plug is energized to generate a spark in the cylinder 42, which ignites the air/fuel mixture. The timing of the spark may be specified relative to the time when the piston is at its topmost position, referred to as top dead center (TDC).

During the combustion stroke, combustion of the air/fuel mixture drives the piston down, thereby driving a crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve. The byproducts of combustion are exhausted from the vehicle via an exhaust system 46.

The transmission system 22 is configured to transmit the power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 48*a*-48*n* that sense observable conditions of the vehicle 10. The sensing devices 48*a*-48*n* can include, but are not limited to, fuel injector sensors that sense observable conditions associated with the fuel injectors 44.

The controller 34 includes at least one processor 54 and a computer readable storage device or media 56. The processor 54 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 56 may include volatile and nonvolatile storage in read-only memory (ROM), random-access memory (RAM), and keep-alive memory (KAM), for example. KAM is a persistent or non-volatile memory that may be used to store various operating variables while the processor 54 is powered down. The computer-readable storage device or media 56 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 54, receive and process signals from the sensor system 28, perform logic, calculations, methods and/or algorithms for controlling the components of the vehicle 10 through the actuator system 30. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the fuel injector monitoring system 100 and, when executed by the processor 54, monitor sensed values associated with the fuel injectors 44 to determine faults of the fuel injectors 44. For example, when a fuel injector fails, the fuel injector is incapable of delivering the desired amount of fuel or any fuel at all. Sensed values from the sensor system 28 are monitored based on machine learning models to determine when a fault occurs. The controller 34 communicates the faults to a notification system 60 of the vehicle 10. The notification system 60 generates notification signals to notify a user of the vehicle 10. As can be appreciated, the notification signal can activate a visual notification system, an audio notification, and/or a haptic notification system.

In various embodiments, the sensed values include voltage data associated with each fuel injector 44. The sensed values are processed into feature data for each injection event. The feature data includes, but is not limited to, an opening period (OT), an opening magnitude (OM), an opening magnitude location (OML), a closing period (CT), and a raw voltage (V). The opening period of the fuel injector 44 may refer to the period between a first time when power is applied to the fuel injector 44 to open the fuel injector 44 and a second time when the fuel injector 44 actually becomes open and begins injecting fuel. The opening magnitude of the fuel injector 44 may correspond to how much the fuel injector 44 opens for a fuel injection event. The closing period of the fuel injector 44 may refer to the period between a first time when power is removed from the fuel injector 44 to close the fuel injector 44 and a second time when the fuel injector 44 actually becomes closed and stops injecting fuel.

The faults can be determined by evaluating the feature data with one or more machine learning models. Different fuel injectors, however, may have different closing periods, opening periods, opening magnitudes, and other characteristics. Thus, the machine learning models can be tuned for each fuel injector type. In various embodiments, the tuning can be performed by a remote system 58 (e.g., offline) and communicated to the controller 34 via the communication system 36 and/or can be performed by the controller 34 (e.g., online).

Figure 2:
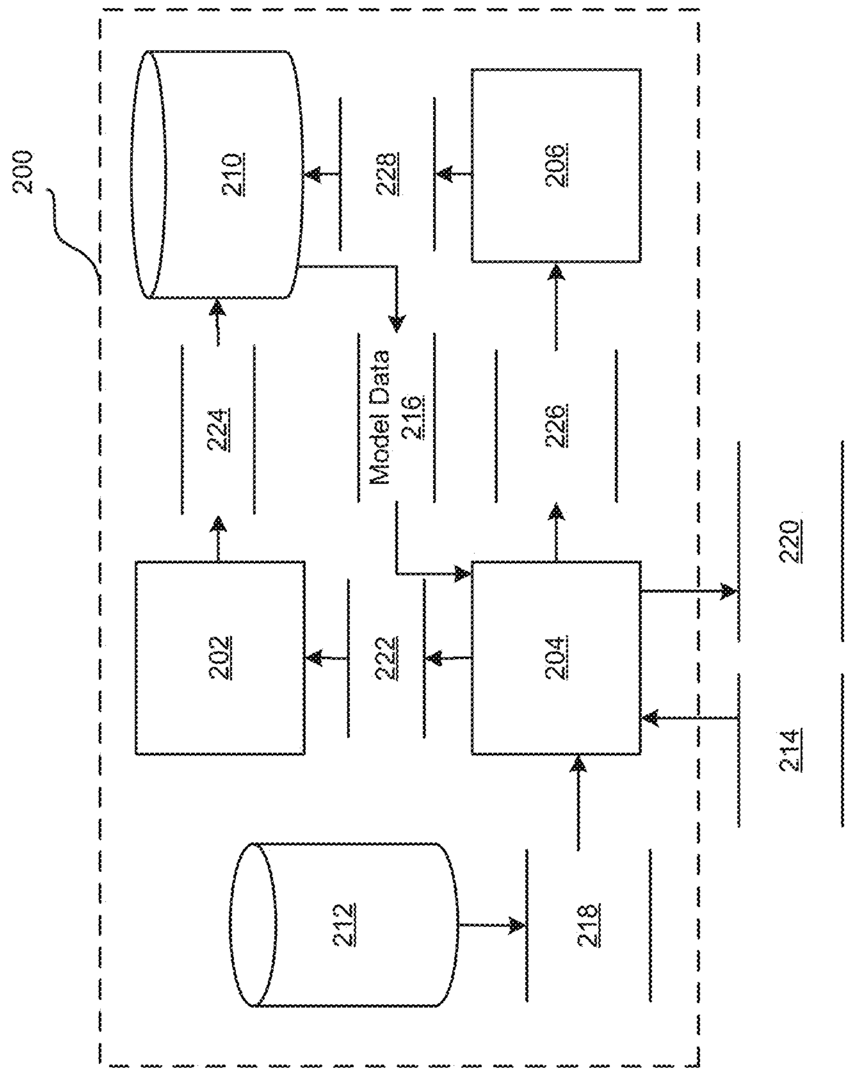
FIG. 2 is a dataflow diagram illustrating a fuel injector monitoring system in accordance with various embodiments.

Referring now to FIG. 2, and with continued reference to FIG. 1, a dataflow diagram illustrates various embodiments of a machine learning system 200 which may be embedded within the controller 34 and which may include parts of the fuel injector monitoring system 100 in accordance with various embodiments. Various embodiments of the machine learning system 200 according to the present disclosure can include any number of sub-modules embedded within the controller 34. As can be appreciated, the sub-modules shown in FIG. 2 can be combined and/or further partitioned to similarly monitor the fuel injectors 44 for faults. Inputs to machine learning system 200 may be received from the sensor system 28, received from other controllers (not shown) associated with the vehicle 10, received from the communication system 36, and/or determined/modeled by other sub-modules (not shown) within the controller 34. In various embodiments, the machine learning system 200 includes a training module 202, a monitoring module 204, a tuning module 206, a model datastore 210, and labeled data datastore 212.

The model datastore 210 stores at least one trained machine learning model used in processing feature set data. In various embodiments, the machine learning model is a logistic regression model. The logistic regression model is trained in a supervised manner as will be discussed in more detail below. The labeled data datastore 212 stores feature set data that is labeled with a fault or no fault status and is used in training the machine learning model. The feature set data may be labeled offline and stored to the controller 34.

The monitoring module 204 receives as input sensed feature set data 214 including data used to diagnose a missing pulse of the fuel injector 44. The feature set data 214 can include, but is not limited to, a first closing time (CT1), a first opening magnitude (OM1), a first opening magnitude location (OM1L), a second opening magnitude (OM2), a second opening magnitude delta (OM2Delta), a location inside window where the second opening magnitude was detected (OM2Location), and a raw voltage at an early point in the window (Evolt). As can be appreciated, the feature set data 214 can include other data in various embodiments and is not limited to the present examples.

The monitoring module 204 retrieves model data 216 including a trained machine learning model from the model datastore 210 and processes the feature set data 214 with the trained machine learning model to predict a fault and provide fault prediction data 220. The fault prediction data 220 may be used by the notification system to notify a user of a fault.

In various embodiments, the monitoring module 204 retrieves the labeled data 218 from the labeled data datastore 212. The monitoring module 204 compares the labeled data 218 with the prediction based on a cost function to determine errors in the prediction and generate error data 222. In various embodiments, the fault prediction data 220 includes the error data 222.

The training module 202 receives the error data 222 and trains the machine learning models stored in the model datastore 210. For example, the training module 202 updates weights of the machine learning model stored in the model datastore 210 based on the error data 222 and using weight data 224. As can be appreciated, the machine learning models can be trained in real time or offline.

In various embodiments, the tuning module 206 tunes the machine learning models stored in the model datastore 210. For example, the tuning module 206 receives modeled data 226 including the predictions from the monitoring module 204 and processes the modeled data 226 to determine a threshold between two or more features of the feature set based on and generate threshold data 228. The tuning module 206 updates the thresholds (e.g., lines, planes, hyper-planes) of the machine learning models stored in the model datastore 210 based on the threshold data 228. As can be appreciated, the machine learning models can be tuned in real time or offline.

Figure 3:
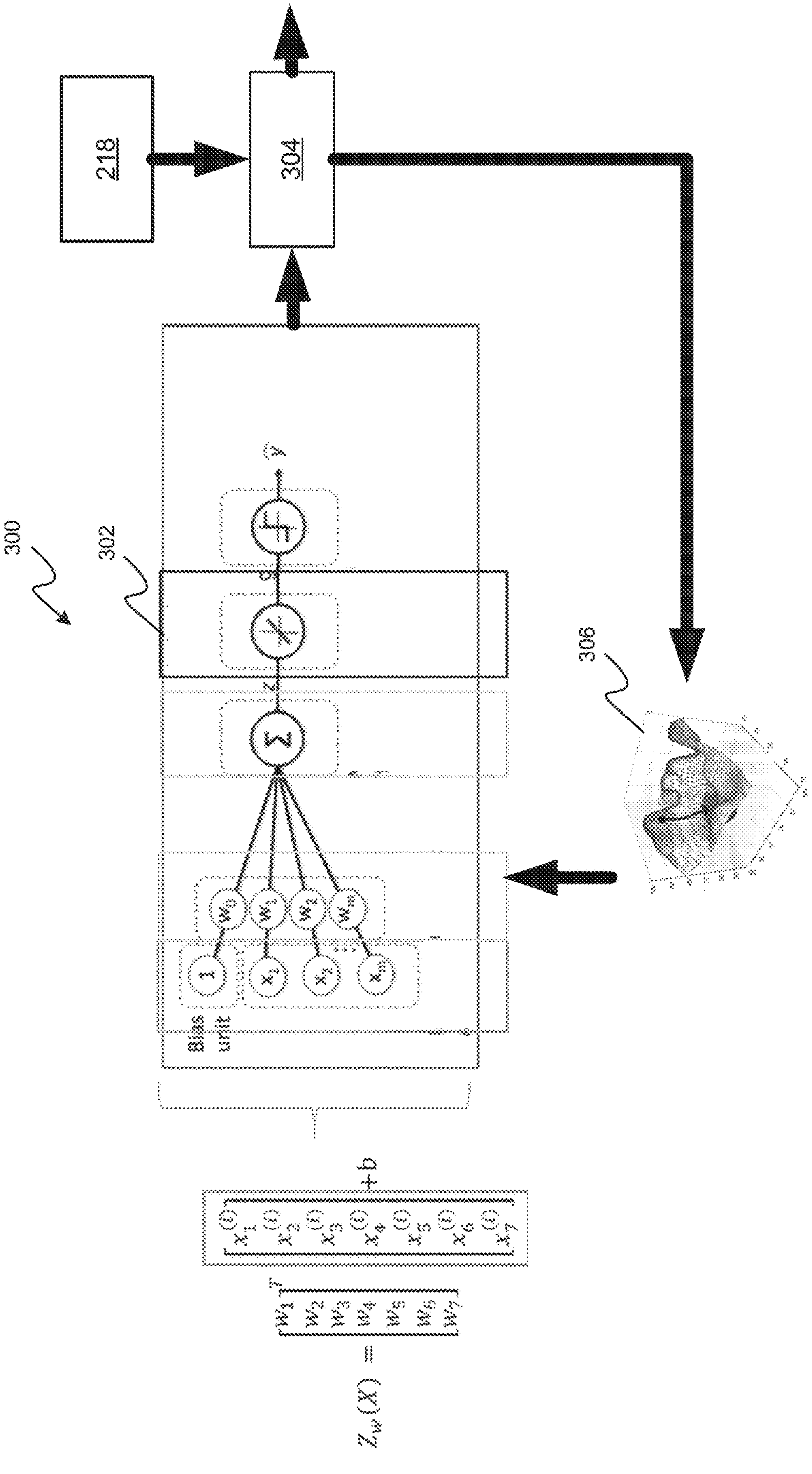
FIG. 3 is a functional block diagram illustrating a machine learning model of the fuel injector monitoring system in accordance with various embodiments.

In various embodiments, as shown in FIG. 3, the machine learning model is a logistic regression model 300. The logistic regression model 300 includes a logistic function 302:

$$g(Z) = \frac{1}{1 + e^{-z}}.$$

The class predictions (e.g., 1 to 0) indicating fault or no fault are determined by summing the multiplications of the model parameters (hypothesis or weights—$w_1$, $w_2$, $w_m$) with the feature set data 214 ($x_1$, $x_2$, $x_m$) through the logistic function 302:

$$g(Z(x)) = \frac{1}{1 + e^{-wX}}.$$

The results is then used as the threshold, for example, any value under 0.5 is a failed condition and a value at about 0.5 is a pass condition. In various embodiments, the predictions are based on a comparison to truth data (i.e., the labeled data 218). For example, the class predictions are compared to the labeled data 218 using a cost function. In various embodiments, a log cost function 304 is based on cross entropy computations using the logarithmic transformation of the sigmoid function:

$$Err(g(h_w(x)), y) = \left\{ \begin{array}{c} -\log(g(h_w(x))), \text{ if } y = 1 \\ -\log(1 - g(h_w(x))), \text{ if } y - 0 \end{array} \right\},$$

$$Err(g(h_w(x)),y)=(y-1)\log(1-g(h_w(x)))-y^*\log(g(h_w(x))).$$

Calculated for all samples:

$$J(w) = \frac{1}{n}\sum_{i=1}^{n} Err(g(h_w(x^i), y^i).$$

The logistic regression model 300 is trained using an optimization algorithm that updates the hypothesis or weights ($w_1$, $w_2$, $w_m$) of the logistic regression model 300 by minimizing calculation errors. For example, the calculated error (Err) is propagated backwards to a previous layer of the model 300, where the error is used to modify the weights. In various embodiments, a chain rule 306 is used in the back-propagation to calculate gradients used in a gradient descent. The gradient descent is then included in weight data 114 which is used to update the weights that are then stored in the logistic regression model of the model datastore 210.

Figure 4:
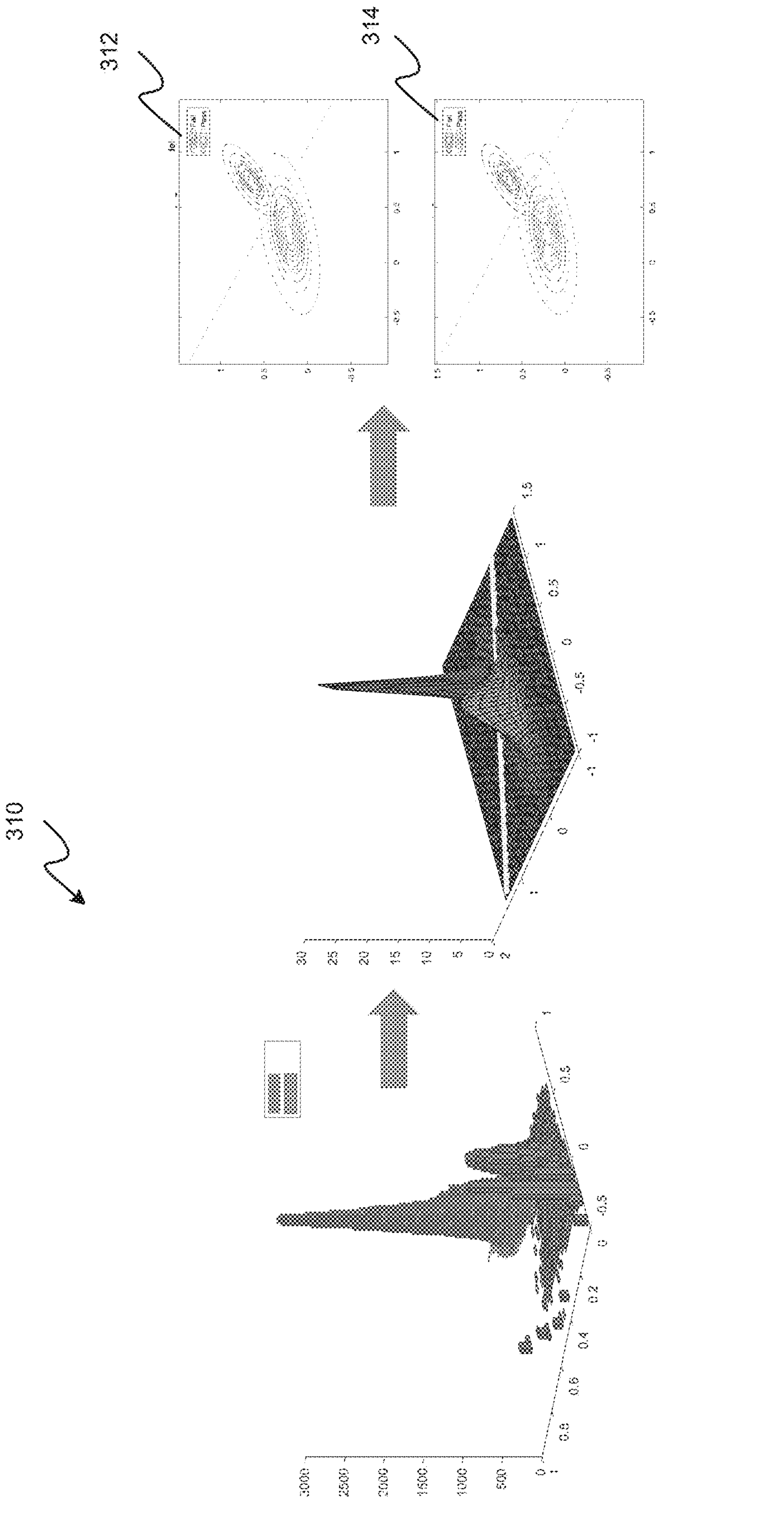
FIG. 4 is illustrations of decompositions resulting from the fuel injector monitoring system in accordance with various embodiments.

In various embodiments, the threshold or bias unit ($w_0$) of the logistic regression model 300 can be tuned. For example, as shown in FIG. 4, decomposition methods 310 such as Cholesky Decomposition is used to analyze the modeled data 226 (FIG. 2) in two-dimensional space. Contours of the distributions can be computed by:

$$r^2=(z-\mu)\Sigma^{-1}(z-\mu)$$

with the parametrization of such an ellipse as lever $r^2$ results in:

$$(x,y)=r(\cos\theta, \sin\theta)M+(\mu_1,\mu_2),$$

where M is:

$$M = \begin{bmatrix} \sigma_1 & \rho\sigma_2 \\ 0 & \sigma_2\sqrt{1-\rho^2} \end{bmatrix}.$$

Where the mahalanobis distance from the Gaussian is known and using the cumulative function, r can be computed explicitly:

$$\rho=1-e^{-r^2/2}$$

$$r=\sqrt{-2\ln(1-\rho)}$$

The threshold or bias unit ($w_0$) of the logistic regression model can be computed by the following:

$$(x, y) = \left(x, \frac{-(w*x+b)}{w_2}\right).$$

The threshold can be modified by moving the intercept as shown at 312 (unmodified) and 314 (modified). The final threshold is stored as the bias unit of the logistic regression model.

Figure 6:
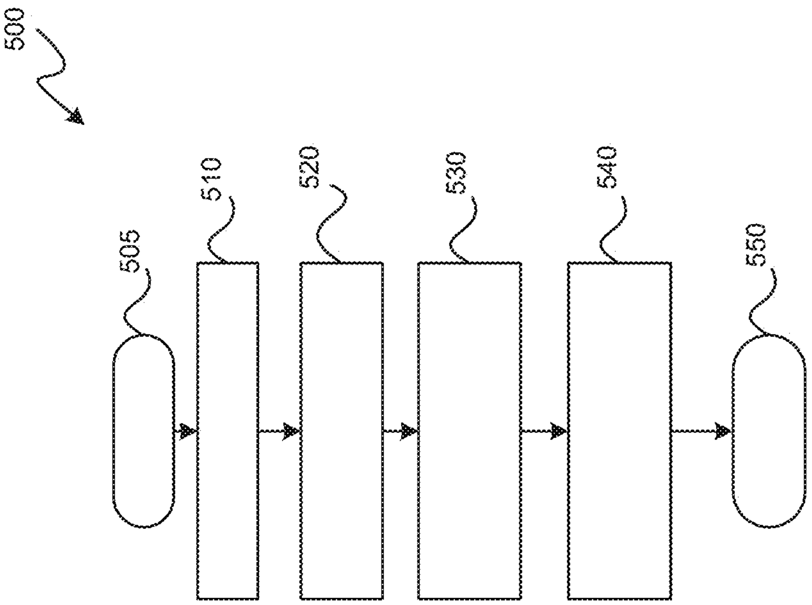
FIGS. 5 and 6 are flowcharts illustrating methods performed by the fuel injector monitoring system in accordance with various embodiments.
Figure 5:
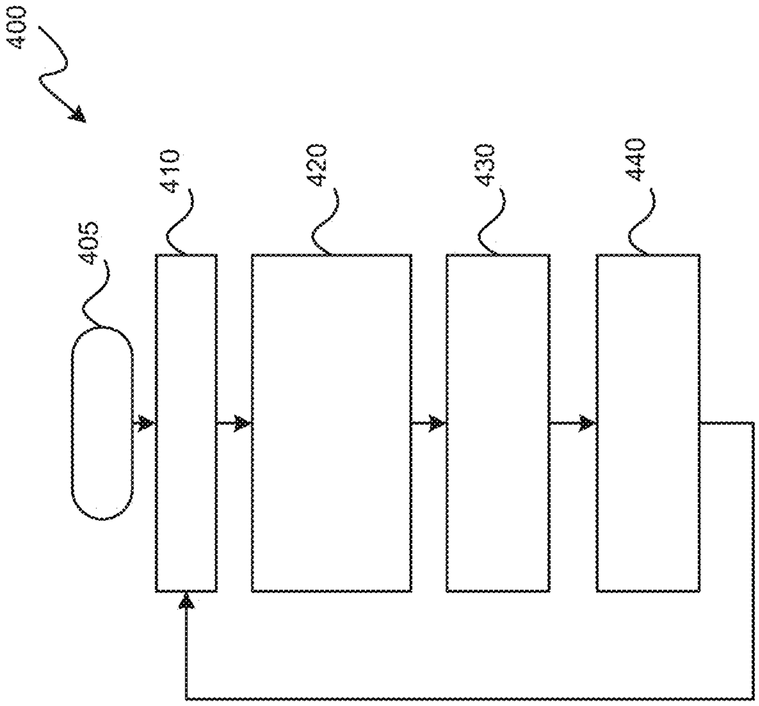

Referring now to FIGS. 5 and 6, and with continued reference to FIGS. 1-4, flowcharts illustrate methods 400, 500 that can be performed by the fuel injector monitoring system 100 of FIG. 1 in accordance with the present disclosure. As can be appreciated in light of the disclosure, the order of operation within the method is not limited to the sequential execution as illustrated in FIGS. 5 and 6 but may be performed in one or more varying orders as applicable and in accordance with the present disclosure.

In various embodiments, the method 400 can be scheduled to run based on one or more predetermined events, and/or can run continuously during operation of the vehicle 10. For example, the method 400 may begin at 405. The feature set data 214 is received at 410. The feature set data 214 is processed with the model retrieved from the model datastore 210 at 420 to obtain a prediction. The prediction is compared with the truth data 218 at 430.

The error is then used to update the weights or the model at 440. Thereafter, the method 400 continues with receiving the next feature set data 214 at 410.

In various embodiments, the method 500 can be scheduled to run based on one or more predetermined events. For example, the method 500 may begin at 505. The predictions are received at 510. Decomposition is applied to the predictions at 520. The threshold is determined based on the interception at 530. The threshold is stored with model at 540. Thereafter, the method 500 may end.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method of monitoring a fuel injector of an internal combustion engine, comprising:

receiving a set of feature data, the feature data sensed from a fuel injector during a fuel injection event, the set of feature data including a first closing time, a first opening magnitude, a first opening magnitude location, a second opening magnitude, a second opening magnitude delta, a location inside a window where the second opening magnitude was detected, and a raw voltage at an early point in the window;

processing, by a processor, the set of feature data with a logistic regression model to generate a prediction of a fault status, wherein the logistic regression model is trained based on comparison of the prediction to truth data; and selectively generating, by the processor, a notification signal based on the prediction.

2. The method of claim 1, wherein the logistic regression model sums the multiplication of the set of feature data with a hypothesis.

3. The method of claim 1, further comprising comparing the prediction with truth data to determine an error.

4. The method of claim 3, wherein the comparing is based on a cost function.

5. The method of claim 3, further comprising updating the logistic regression model based on the error.

6. The method of claim 5, wherein the updating is based on a chain rule method.

7. The method of claim 1, further comprising tuning the logistic regression model based on distributions computed from the prediction.

8. The method of claim 7, wherein the tuning comprises adjusting a bias unit of a logistic regression model.

9. A system for monitoring a fuel injector of an internal combustion engine, comprising:

at least one sensor that generates sensor data based on observable conditions of the fuel injector, wherein the sensor data includes a first closing time, a first opening magnitude, a first opening magnitude location, a second opening magnitude, a second opening magnitude delta, a location inside a window where the second opening magnitude was detected, and a raw voltage at an early point in the window; and a controller configured to, by a processor, receive the sensor data, process the sensor data with a logistic regression model to generate a prediction of a fault status, and selectively generate a notification signal based on the prediction, wherein the logistic regression model is trained based on comparison of the prediction to truth data.

10. The system of claim 9, wherein the logistic regression model sums the multiplication of the set of feature data with hypothesis.

11. The system of claim 9, wherein the controller is further configured to compare the prediction with the truth data to determine an error.

12. The system of claim 11, wherein the controller compares based on a cost function.

13. The system of claim 11 wherein the controller is configured to update the logistic regression model based on the error.

14. The system of claim 13, wherein the controller is configured to update the logistic regression model further based on a chain rule method.

15. The system of claim 9, wherein the controller is configured to tune the logistic regression model based on distributions computed from the prediction.

16. The system of claim 15, wherein the controller is configured to tune the logistic regression model by adjusting a bias unit of the logistic regression model.

* * * * *